United States Patent
Sun et al.

(10) Patent No.: US 11,902,999 B2
(45) Date of Patent: Feb. 13, 2024

(54) GROUP COMMON-PHYSICAL DOWNLINK CONTROL CHANNEL (GC-PDCCH) FOR TRIGGERING FEEDBACK FOR MULTIMEDIA BROADCAST MULTICAST SERVICE (MBMS) GROUP COMMON-PHYSICAL DATA SHARED CHANNELS (GC-PDSCHS)

(71) Applicant: QUALCOMM Incorporated, San Diego, CA (US)

(72) Inventors: Jing Sun, San Diego, CA (US); Xiaoxia Zhang, San Diego, CA (US); Le Liu, Fremont, CA (US); Mostafa Khoshnevisan, San Diego, CA (US); Ayan Sengupta, San Diego, CA (US); Prasad Reddy Kadiri, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 181 days.

(21) Appl. No.: 17/491,427

(22) Filed: Sep. 30, 2021

(65) Prior Publication Data
US 2022/0110092 A1 Apr. 7, 2022

Related U.S. Application Data

(60) Provisional application No. 63/086,961, filed on Oct. 2, 2020.

(51) Int. Cl.
*H04W 72/30* (2023.01)
*H04L 5/00* (2006.01)
*H04W 72/23* (2023.01)

(52) U.S. Cl.
CPC .......... *H04W 72/30* (2023.01); *H04L 5/0055* (2013.01); *H04W 72/23* (2023.01)

(58) Field of Classification Search
CPC .... H04W 72/30; H04W 72/23; H04L 5/0055; H04L 5/0053
USPC ........................................... 370/312
See application file for complete search history.

(56) References Cited

U.S. PATENT DOCUMENTS

2018/0152274 A1* 5/2018 Li .................... H04L 5/0055
2021/0378003 A1* 12/2021 Yang ................. H04L 1/1812

* cited by examiner

*Primary Examiner* — Mang Hang Yeung
(74) *Attorney, Agent, or Firm* — Kevin M. Donnelly; Seyfarth Shaw LLP

(57) ABSTRACT

A method for wireless communication performed by a user equipment (UE) includes receiving, from a base station on a granting group common (GC)-physical downlink control channel (PDCCH), a multimedia broadcast multicast service (MBMS) downlink grant that schedules an MBMS transmission at each UE of a group of UEs that includes the UE. The method also includes receiving, from the base station on a triggering GC-PDCCH, a message indicating respective feedback resources for each UE of the group of UEs. The method further includes receiving, from the base station, the MBMS transmission. The method still further includes transmitting, to the base station via the feedback resources, a feedback report based on receiving the MBMS transmission.

30 Claims, 9 Drawing Sheets

GROUP COMMON-PHYSICAL DOWNLINK CONTROL CHANNEL (GC-PDCCH) FOR TRIGGERING FEEDBACK FOR MULTIMEDIA BROADCAST MULTICAST SERVICE (MBMS) GROUP COMMON-PHYSICAL DATA SHARED CHANNELS (GC-PDSCHS)

CROSS-REFERENCE TO RELATED APPLICATION

The present application claims the benefit of U.S. Provisional Patent Application No. 63/086,961 filed on Oct. 2, 2020, and titled "GROUP COMMON-PHYSICAL DOWNLINK CONTROL CHANNEL (GC-PDCCH) FOR TRIGGERING FEEDBACK FOR MULTIMEDIA BROADCAST MULTICAST SERVICE (MBMS) GROUP COMMON-PHYSICAL DATA SHARED CHANNELS (GC-PDSCHS)," the disclosure of which is expressly incorporated by reference in its entirety.

FIELD OF THE DISCLOSURE

Aspects of the present disclosure generally relate to wireless communication, and more particularly to triggering feedback for multimedia broadcast multicast service (MBMS) group common-physical data shared channels (GC-PDSCHs) via a group common-physical downlink control channel (GC-PDCCH).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

A group common (GC) physical data shared channel (PDSCH) (GC-PDSCH) may transmit multimedia broadcast multicast service (MBMS) information. In some cases, the GC-PDSCH may support user equipment (UE)-specific feedback, such as hybrid automatic repeat request (HARD) feedback. A GC physical downlink control channel (PDCCH) (GC-PDCCH) may schedule an initial GC-PDSCH transmission or a GC-PDSCH retransmission to a group of UEs. The GC-PDCCH may also identify feedback resources for the group of UEs. In some examples, the group of UEs may transmit feedback over the same feedback resources at the same time. The feedback transmitted by the group of UEs may collide and increase network overhead. It may be desirable to improve feedback for GC-PDSCHs to reduce feedback interference and reduce network overhead.

SUMMARY

In one aspect of the present disclosure, a method for wireless communication at a user equipment (UE) is disclosed. The method includes receiving, from a base station on a granting group common (GC)-physical downlink control channel (PDCCH), a multimedia broadcast multicast service (MBMS) downlink grant that schedules an MBMS transmission at each UE of a group of UEs that includes the UE. The method also includes receiving, from the base station on a triggering GC-PDCCH, a message indicating respective feedback resources for each UE of the group of UEs. The method further includes receiving, from the base station, the MBMS transmission. The method still further includes transmitting, to the base station via the feedback resources, a feedback report based on receiving the MBMS transmission.

Another aspect of the present disclosure is directed to an apparatus including means for receiving, from a base station on a granting GC-PDCCH, an MBMS downlink grant that schedules an MBMS transmission at each UE of a group of UEs that includes the UE. The apparatus also includes means for receiving, from the base station on a triggering GC-PDCCH, a message indicating respective feedback resources for each UE of the group of UEs. The apparatus further includes means for receiving, from the base station, the MBMS transmission. The apparatus still further includes means for transmitting, to the base station via the feedback resources, a feedback report based on receiving the MBMS transmission.

In another aspect of the present disclosure, a non-transitory computer-readable medium with non-transitory program code recorded thereon is disclosed. The program code is for wireless communication at a UE. The program code is executed by a processor and includes program code to receive, from a base station on a granting GC-PDCCH, an MBMS downlink grant that schedules an MBMS transmission at each UE of a group of UEs that includes the UE. The program code also includes program code to receive, from the base station on a triggering GC-PDCCH, a message indicating respective feedback resources for each UE of the group of UEs. The program code further includes program code to receive, from the base station, the MBMS transmission. The program code still further includes program code to transmit, to the base station via the feedback resources, a feedback report based on receiving the MBMS transmission.

Another aspect of the present disclosure is directed to an apparatus. The apparatus having a memory, one or more processors coupled to the memory, and instructions stored in the memory. The instructions being operable, when executed by the processor, to cause the apparatus to receive, from a base station on a granting GC-PDCCH, an MBMS downlink grant that schedules an MBMS transmission at each UE of a group of UEs that includes the UE. Execution of the instructions also cause the apparatus to receive, from the base station on a triggering GC-PDCCH, a message indicating respective feedback resources for each UE of the group of UEs. Execution of the instructions additionally cause the apparatus to receive, from the base station, the MBMS transmission. Execution of the instructions further cause the apparatus to transmit, to the base station via the feedback resources, a feedback report based on receiving the MBMS transmission.

In one aspect of the present disclosure, a method for wireless communication by a base station is disclosed. The method includes transmitting, to multiple UEs via a granting GC-PDCCH, an MBMS downlink grant that schedules an MBMS transmission at each UE of the plurality of UEs. The method also includes transmitting, to each UE of the multiple UEs via a triggering GC-PDCCH, a message indicating respective feedback resources for the MBMS transmission associated with the MBMS downlink grant. The method further includes transmitting, to the multiple UEs, the MBMS transmission based on the MBMS downlink grant. The method still further includes receiving, from each UE of the multiple UEs via the respective feedback resources, a feedback report associated with the MBMS transmission.

Another aspect of the present disclosure is directed to an apparatus including means for transmitting, to multiple UEs via a granting GC-PDCCH, an MBMS downlink grant that schedules an MBMS transmission at each UE of the plurality of UEs. The apparatus also includes means for transmitting, to each UE of the multiple UEs via a triggering GC-PDCCH, a message indicating respective feedback resources for the MBMS transmission associated with the MBMS downlink grant. The apparatus further includes means for transmitting, to the multiple UEs, the MBMS transmission based on the MBMS downlink grant. The apparatus still further includes means for receiving, from each UE of the multiple UEs via the respective feedback resources, a feedback report associated with the MBMS transmission.

In another aspect of the present disclosure, a non-transitory computer-readable medium with non-transitory program code recorded thereon is disclosed. The program code is for wireless communication at a base station. The program code is executed by a processor and includes program code to transmit, to multiple UEs via a granting GC-PDCCH, an MBMS downlink grant that schedules an MBMS transmission at each UE of the plurality of UEs. The program code also includes program code to transmit, to each UE of the multiple UEs via a triggering GC-PDCCH, a message indicating respective feedback resources for the MBMS transmission associated with the MBMS downlink grant. The program code further includes program code to transmit, to the multiple UEs, the MBMS transmission based on the MBMS downlink grant. The program code still further includes program code to receive, from each UE of the multiple UEs via the respective feedback resources, a feedback report associated with the MBMS transmission.

Another aspect of the present disclosure is directed to an apparatus. The apparatus having a memory, one or more processors coupled to the memory, and instructions stored in the memory. The instructions being operable, when executed by the processor, to cause the apparatus to transmit, to multiple UEs via a granting GC-PDCCH, an MBMS downlink grant that schedules an MBMS transmission at each UE of the plurality of UEs. Execution of the instructions also cause the apparatus to transmit, to each UE of the multiple UEs via a triggering GC-PDCCH, a message indicating respective feedback resources for the MBMS transmission associated with the MBMS downlink grant. The instructions additionally cause the apparatus to transmit, to the multiple UEs, the MBMS transmission based on the MBMS downlink grant. Execution of the instructions further cause the apparatus to receive, from each UE of the multiple UEs via the respective feedback resources, a feedback report associated with the MBMS transmission.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
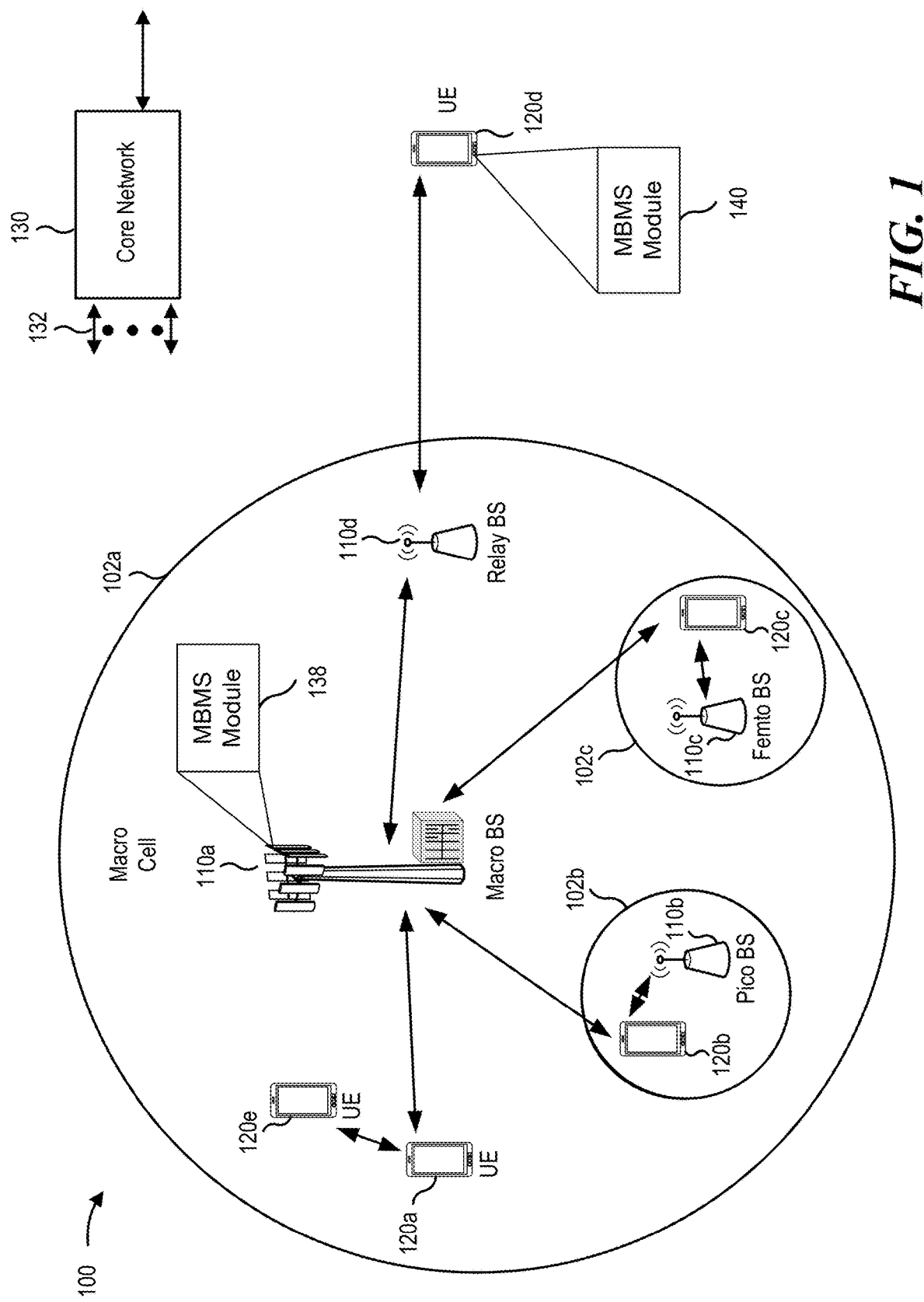
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

As discussed, a group common (GC) physical data shared channel (PDSCH) (GC-PDSCH) may transmit multimedia broadcast multicast service (MBMS) information. In some cases, the GC-PDSCH may support user equipment (UE)-specific feedback, such as hybrid automatic repeat request (HARD) feedback. A GC physical downlink control channel (PDCCH) (GC-PDCCH) may schedule an initial GC-PDSCH transmission or a GC-PDSCH retransmission to a group of UEs. The GC-PDCCH may also identify feedback resources for the group of UEs. In some examples, the group of UEs may transmit feedback reports over the same feedback resources at the same time, thus resulting in collisions between the feedback reports. Network overhead may increase as a result of the collisions because each UE of the group of UEs may be forced to re-transmit a feedback report. It may be desirable to improve feedback for GC-PDSCHs to reduce feedback collisions (for example, feedback interference).

Aspects of the present disclosure generally relate to techniques and apparatuses for triggering feedback for an MBMS transmission received on a GC-PDSCH scheduled based on an MBMS downlink grant. In some specific examples, a base station transmits an MBMS downlink grant to a group of multiple UEs via a GC-PDCCH. The MBMS downlink grant may schedule an MBMS transmission for the group of UEs. In such examples, the base station may also transmit, to the group of UEs via a triggering GC-PDCCH, a message indicating respective feedback resources for each UE of the group of UEs to use to report feedback for the MBMS transmission associated with the MBMS downlink grant. Different feedback resources may be specified for each UE to prevent the collision of respective feedback reports transmitted by the multiple UEs. After transmitting the triggering GC-PDCCH, the base station may transmit the MBMS transmission to the group of UEs based on the MBMS downlink grant. Each UE of the group of UEs may then transmit, to the base station, a feedback report associated with the MBMS transmission via the respective feedback resources.

Particular aspects of the subject matter described in this disclosure may be implemented to realize one or more of the following potential advantages. In some examples, UE-specific feedback for an MBMS transmission may be triggered by a triggering GC-PDCCH that allocates separate feedback resources for each UE of a group of UEs. In such examples, the separate feedback resources may reduce collisions between two or more feedback reports. Additionally, a reduction in collisions between feedback reports may reduce a number of feedback report re-transmissions, thereby decreasing network overhead.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with UEs and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include an MBMS module 140. For brevity, only one UE 120d is shown as including the MBMS module 140. The MBMS module 140 may receive, from the base station 110 on a GC-PDCCH, an MBMS downlink grant that schedules an MBMS transmission at each UE of a group of UEs that includes the UE 120d. The MBMS module 140 may also receive, from the base station 110 on a triggering GC-PDCCH, a message indicating respective feedback resources for each UE of the group of UEs. Furthermore, the MBMS module 140 may further receive, from the base station 110, the MBMS transmission. Additionally, the MBMS module 140 may transmit, to the base station 110 via the feedback resources, a feedback report based on receiving the MBMS transmission.

The base stations 110 may include an MBMS module 138 for transmitting, to multiple UEs 120 via a granting GC-PDCCH, an MBMS downlink grant that schedules an MBMS transmission at each UE 120 of the multiple UEs 120. The MBMS module 138 may also transmit, to each UE 120 of the multiple UEs 120 via a triggering GC-PDCCH, a message indicating respective feedback resources for the MBMS transmission associated with the MBMS downlink grant. Additionally, the MBMS module 138 may transmit, to the multiple UEs 120, the MBMS transmission based on the MBMS downlink grant. Furthermore, the MBMS module 138 may receive, from each UE 120 of the multiple UEs 120 via the respective feedback resources, a feedback report associated with the MBMS transmission.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

Figure 2:
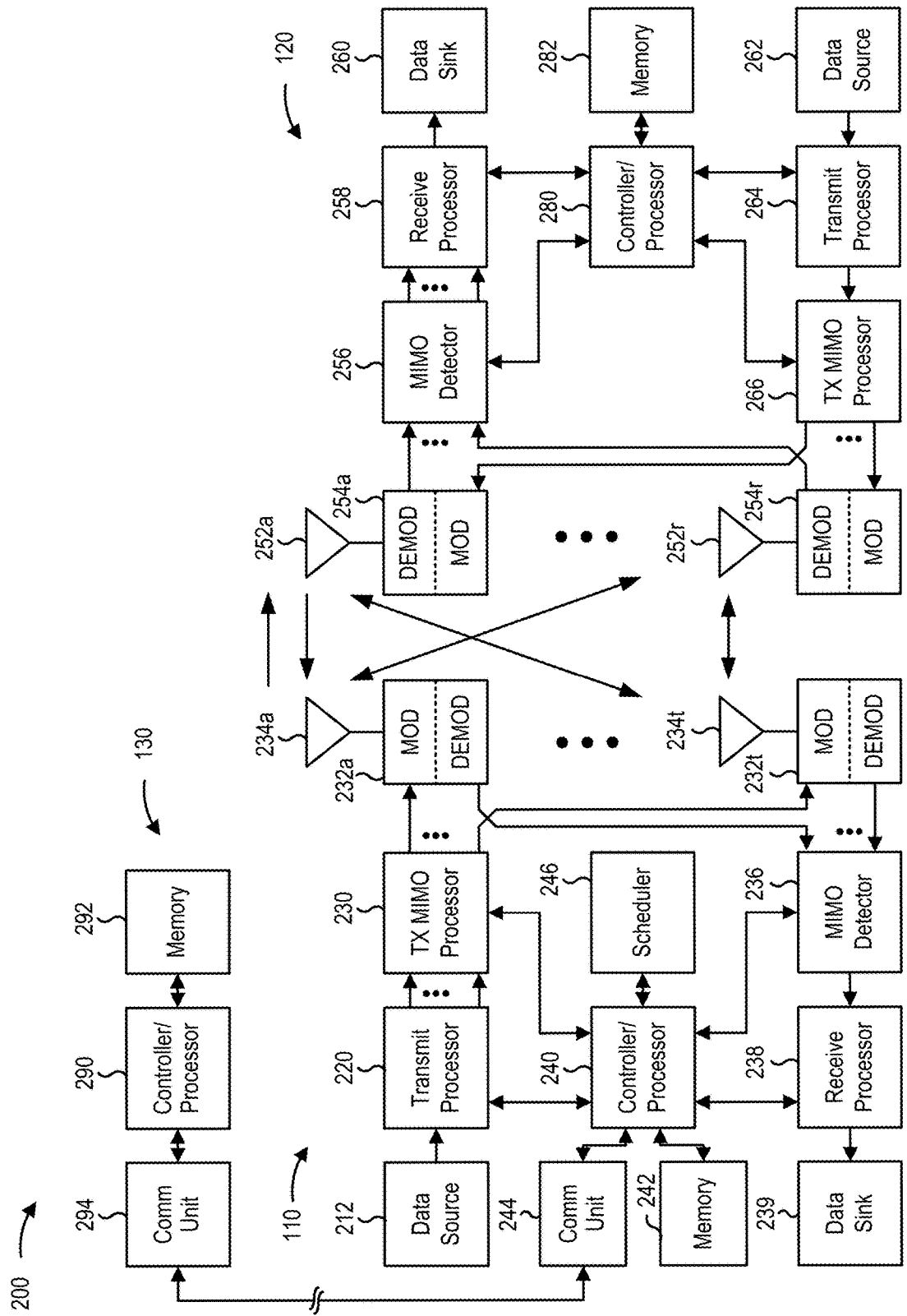
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with indicating GC-PDSCH feedback resources via a triggering GC-PDCCH as described in more detail elsewhere. For example, the controller/processor 240 of the base station 110, the controller/processor 280 of the UE 120, and/or any other component(s) of FIG. 2 may perform or direct operations of, for example, the process of FIGS. 8 and 9 as well as other processes as described. Memories 242 and 282 may store data and program codes for the base station 110 and UE 120, respectively. A scheduler 246 may schedule UEs for data transmission on the downlink and/or uplink.

In some wireless communications systems, such as 3GPP Release 16, a non-numerical K1 (NNK1) parameter may be used for an unlicensed spectrum, such as NR unlicensed (NR-U). The NNK1 parameter may be used instead of a K1 parameter when a base station does not know when to schedule feedback for a granted PDSCH. The K1 parameter may indicate an offset between the granted PDSCH and an uplink slot for transmitting the feedback for the granted PDSCH.

In some examples, for NR-U, a granted PDSCH may be scheduled towards an end of a channel occupancy time (COT). In such examples, the feedback may not be reported in the same COT as the granted PDSCH. Thus, the base station may not know when to schedule feedback for the granted PDSCH. In some examples, a listen-before-talk (LBT) procedure for an uplink transmission may fail when the feedback is not reported in the same COT as the granted PDSCH. In some other examples, to reduce LBT failures, the base station may indicate the NNK1 parameter for the PDSCH. In such examples, at the next COT, the base station may grant another PDSCH via downlink control information (DCI) including a valid K1 parameter. Additionally, in such examples, the UE may multiplex the feedback corresponding to the NNK1 parameter with feedback corresponding to the valid K1 parameter. In some other examples, the base station may transmit an empty downlink (DL) grant. That is, the empty grant may not be associated with a PDSCH. Still, the empty DL grant may include a valid K1 parameter. In such examples, the UE may report the feedback corresponding to the NNK1 parameter during the feedback opportunity provided by the K1 parameter of the empty DL grant.

In conventional systems, a GC-PDCCH may grant an initial GC-PDSCH transmission or a GC-PDSCH retransmission. Additionally, the GC-PDCCH may identify feedback resources for each UE in a group of UEs receiving the GC-PDSCH. Because the GC-PDCCH may be common to the group of UEs, the K1 parameter and a physical uplink control channel (PUCCH) resource indicator (PRI) indicated in the GC-PDCCH may apply to each UE in the group of UEs. As described above, in some examples, the group of UEs may transmit feedback over the same feedback resources at the same time. The feedback transmitted by the group of UEs may collide and increase network overhead. In some other examples, different UEs in the group of UEs may use different feedback resources based on different interpretations of the PRI. Such examples may be difficult to implement. It may be desirable to transmit UE-specific feedback triggers to each UE in the group of UEs.

For 3GPP Release 17, and beyond, the GC-PDSCH may support UE-specific feedback. In some examples, a base station, such as a gNB, may schedule retransmission of an initial PDSCH transmission to one or more UEs in a group of UEs based on a UE transmitting a negative acknowledgment (NAK) for the initial PDSCH transmission. Additionally, in some examples, a hybrid automatic repeat request (HARQ) process space for the GC-PDSCH associated with MBMS transmissions may be separated from a HARQ process space for unicast data. In such examples, the HARQ acknowledgment (ACK) reporting for MBMS transmissions may be distinct from a conventional PDSCH HARQ ACK codebook. Additionally, in such examples, the MBMS HARQ ACK may be dropped based on priority. Furthermore, in such examples, an NNK1 parameter may trigger MBMS feedback to avoid collision with a unicast uplink transmission, such as a unicast physical uplink shared channel (PUSCH) or a unicast PUCCH.

As described, a GC-PDCCH granting an MBMS transmission on a GC-PDSCH may indicate feedback resource information. Therefore, it may be difficult to mitigate feedback collision based on simultaneous feedback from two or more UEs. The GC-PDCCH granting the MBMS transmission may be referred to as the granting GC-PDCCH.

Aspects of the present disclosure are directed to indicating feedback resources in a GC-PDCCH that is separate from the granting GC-PDCCH. The GC-PDCCH indicating the feedback resources may be referred to as a triggering GC-PDCCH. The triggering GC-PDCCH may reduce network overhead and reduce feedback collisions. In some aspects, the UE may be configured to monitor a search space for the triggering GC-PDCCH. In such aspects, the UE may multiplex the MBMS feedback with unicast feedback or drop feedback based on priority.

Figure 3:
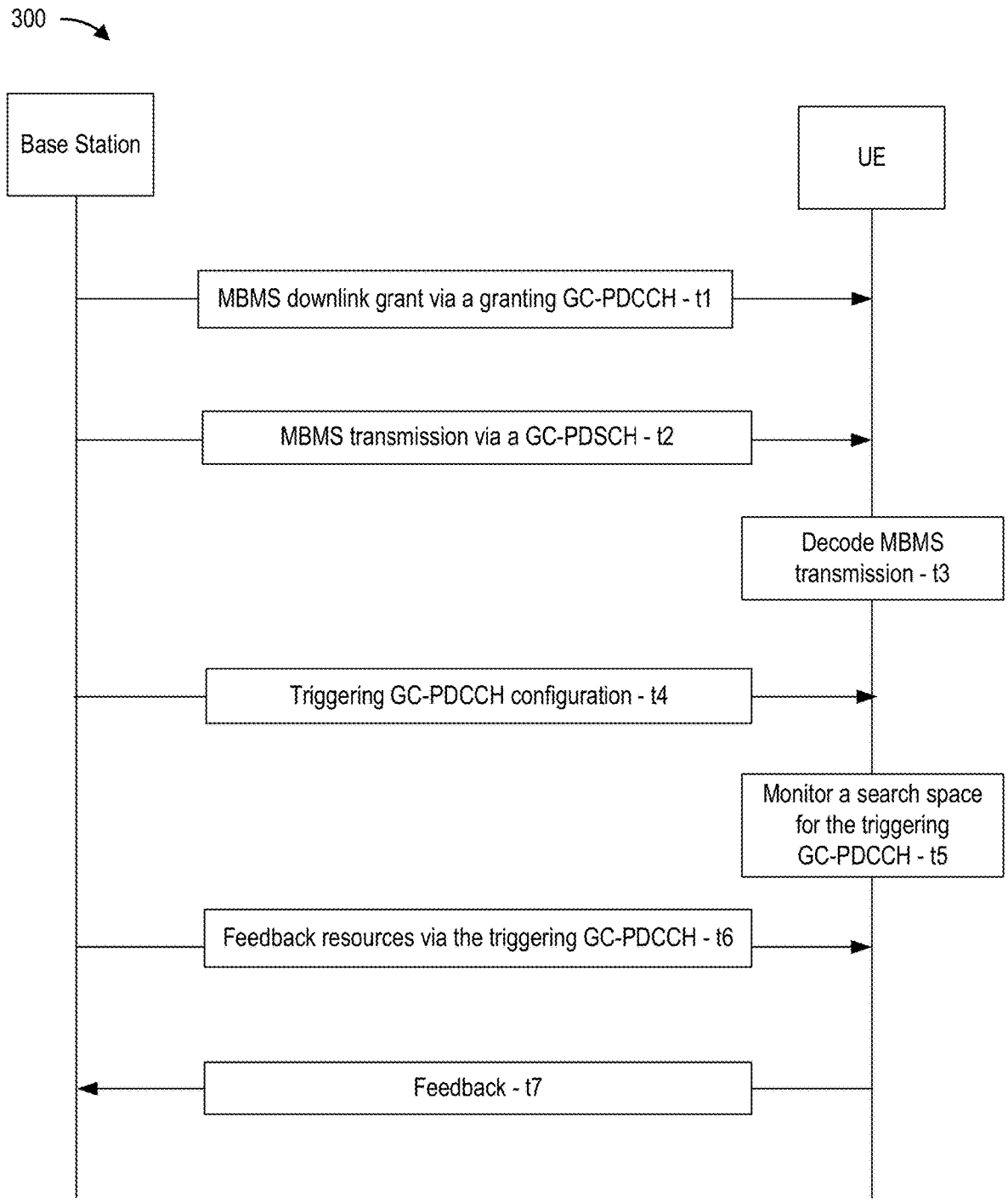
FIG. 3 is a timing diagram illustrating an example of a triggering group common (GC)-physical downlink control channel (PDCCH), in accordance with aspects of the present disclosure.

FIG. 3 is a timing diagram illustrating an example 300 of a triggering GC-PDCCH, in accordance with aspects of the present disclosure. As described, in some aspects, a triggering GC-PDCCH may trigger a UE to transmit the MBMS HARQ feedback. For example, as shown in FIG. 3, at time t1, a base station may transmit an MBMS downlink grant via a granting GC-PDCCH to the UE. The MBMS downlink grant may be a grant for a GC-PDSCH. In the example of FIG. 3, the base station may be a base station 110 as described with respect to FIG. 1. Additionally, the UE of FIG. 3 may be a UE 120 as described with respect to FIG. 1. At time t2, the base station may transmit the MBMS transmission via a GC-PDSCH granted based on the MBMS downlink grant. Additionally, at time t3, the UE decodes the received MBMS transmission.

In some implementations, at time t4, the UE receives a triggering GC-PDCCH configuration including, for example, a search space for the triggering GC-PDCCH, a length of the triggering GC-PDCCH, and a radio network temporary identifier (RNTI) of the triggering GC-PDCCH. The RNTI of the triggering GC-PDCCH may different from, or the same as, the RNTI of the granting GC-PDCCH. The triggering GC-PDCCH configuration received at time t4 may be received before or after receiving the MBMS transmission at time t2. The triggering GC-PDCCH configuration may also indicate one or more feedback bit fields of the triggering GC-PDCCH. The one or more feedback bit fields may indicate feedback resources for a feedback report, such as, for example, timing (for example, a K1 parameter)

for the feedback report, a codebook size for the feedback report, and a PRI for the feedback resources. In some implementations, the information in the one or more bit fields may be jointly encoded. In some examples, the K1 parameter and the PRI may be jointly encoded.

As shown in FIG. 3, at time t5, the UE monitors the search space indicated in the triggering GC-PDCCH configuration. Additionally, at time t6, the base station may transmit, via a triggering GC-PDCCH, a message identifying feedback resources for an MBMS transmission associated with the MBMS downlink grant. The UE may identify the triggering GC-PDCCH based on the triggering GC-PDCCH configuration. Additionally, the UE may identify one or more bit fields of the triggering GC-PDCCH based on the triggering GC-PDCCH configuration. In some implementations, the one or more bit fields may trigger a feedback report. In other implementations, the one or more bit fields may indicate that a feedback report should not be transmitted. In other implementations, the one or more bit fields may trigger transmission of a type 3 feedback report. The type 3 feedback report may include feedback for all configured HARQ process IDs. In some examples, the type 3 feedback report may be configured to provide a new data indicator (NDI) for each feedback report. In some implementations, one triggering GC-PDCCH may be configured for a dynamic feedback report and another triggering GC-PDCCH may be configured for the type 3 feedback report.

In the example of FIG. 3, at time t7, the UE may transmit feedback based on the MBMS transmission received at time t2. The UE may transmit feedback with the feedback resources indicated in the message transmitted in the triggering GC-PDCCH. In some examples, the feedback report may include an ACK if the UE successfully decoded the MBMS transmission at time t3. In other examples, the feedback report may include a NAK if the UE failed to successfully decode the MBMS transmission at time t3.

In some implementations, a codebook size for the feedback report may be based on a latest downlink assignment index (DAI) value corresponding to a DAI counter of a last granting GC-PDCCH. In such implementations, each granting GC-PDCCH includes a DAI counter. In some examples, the UE determines the DAI counter and the latest DAI value based on a modulo function. In one such example, the modulo function may be mod 4, such that a DAI counter is initiated at zero and resets at four. The latest DAI value may be indicated via the GC-PDSCH.

Figure 4:
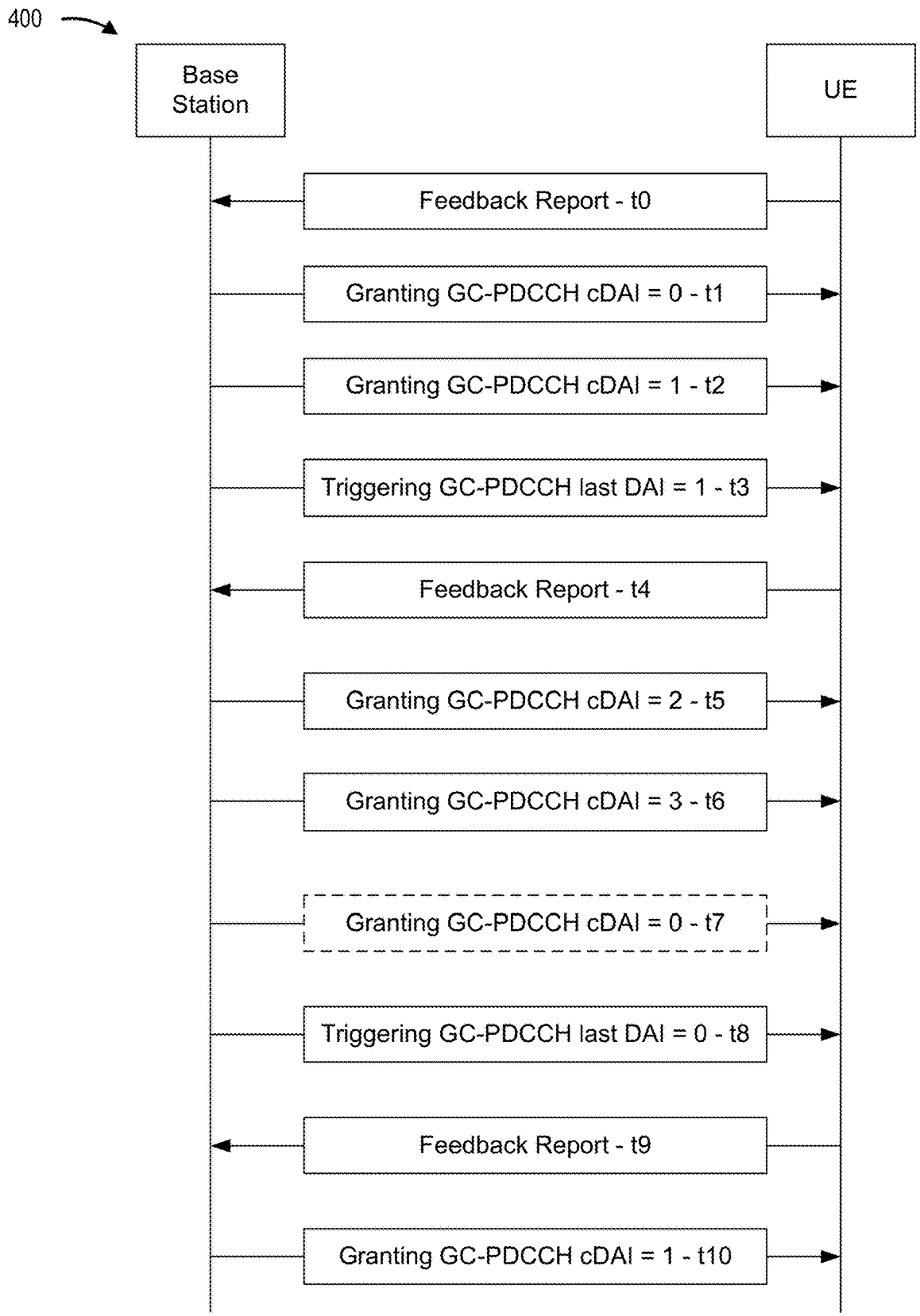
FIG. 4 is a timing diagram illustrating an example of determining a codebook size for a feedback report, in accordance with aspects of the present disclosure.

FIG. 4 is a timing diagram illustrating an example 400 of determining a codebook size for a feedback report, in accordance with aspects of the present disclosure. In the example of FIG. 4, at time t0, a UE transmits a feedback report to a base station based on a triggering GC-PDCCH received prior to time t0. Additionally, at time t1, the UE receives a granting GC-PDCCH with a DAI counter (cDAI) equal to zero. Additionally, at time t2, the UE receives a granting GC-PDCCH with a cDAI equal to one. In some implementations, the UE may receive an MBMS transmission based on each received granting GC-PDCCH. Thus, in the example of FIG. 4, the UE may receive an MBMS transmission based on the granting GC-PDCCH received at time t1 and another MBMS transmission based on the granting GC-PDCCH received at time t2. In the example of FIG. 4, at time t3, the UE receives a triggering GC-PDCCH including the last DAI value (for example, the last DAI value equals one).

As described, in some implementations, the UE may determine a size of a feedback codebook based on the last DAI value received in the triggering GC-PDCCH. In the example of FIG. 4, based on the last DAI value included in the triggering GC-PDCCH received at time t3, the UE may identify a set of MBMS transmissions granted by a set of granting GC-PDCCHs between a time associated with transmitting a most recent feedback report (for example, time t0) and a time associated with a next scheduled feedback report (for example, time t4). The feedback report may include feedback for the identified set of MBMS transmissions. In the example of FIG. 3, the UE may determine the cDAI of the last received granting GC-PDCCH (cDAI=1) (for example, the granting GC-PDCCH received at time t2 prior to receiving the triggering GC-PDCCH at time t3) is equal to the last DAI value (last DAI=1) indicated in the triggering GC-PDCCH. Thus, based on the cDAI equaling the last DAI value, the UE may determine that feedback is to be reported for a set of MBMS transmissions granted by the two granting GC-PDCCHs received at times t1 and t2. Therefore, in the example of FIG. 4, at time t4, the UE transmits a feedback report including feedback for the set of MBMS transmissions granted by the two granting GC-PDCCHs received at times t1 and t2.

In some examples, the UE may continue receiving granting GC-PDCCHs after receiving the triggering GC-PDCCH. The cDAI of the granting GC-PDCCHs continues from the last cDAI received prior to receiving the triggering GC-PDCCH. For example, at time t5, the UE receives a granting GC-PDCCH with a cDAI equal to two. Additionally, at time t6, the UE receives a granting GC-PDCCH with a cDAI equal to three. As described, a value of the cDAI may be a function of a modulo operation (for example, modulo m=4). In such examples, the cDAI may reset to zero after the cDAI reaches three. For example, at time t7, the base station may transmit a granting GC-PDCCH with a cDAI equal to zero. Still, in this example, for illustrative purposes, the UE may fail to receive the granting GC-PDCCH transmitted at time t7. In the example of FIG. 4, at time t8, the UE receives a triggering GC-PDCCH indicating a last DAI value of zero.

The UE may compare the last DAI value of the triggering GC-PDCCH received at time t8 with the cDAI of a latest receive granting GC-PDCCH, which is the granting GC-PDCCH received at time t6. Because the last DAI value (zero) does not match the cDAI (three) of the latest received granting GC-PDCCH, the UE may identify a missing granting GC-PDCCH (for example, the granting GC-PDCCH with the cDAI equal to zero). At time t9, the UE may transmit a feedback report for MBMS transmissions corresponding to the granting GC-PDCCHs identified from the last DAI value. In the example of FIG. 4, the feedback report may include an ACK for the MBMS transmissions corresponding to the granting GC-PDCCHs received at times t5 and t6. Additionally, the feedback report may include a NAK for the missing MBMS transmission corresponding to the granting GC-PDCCH with the cDAI equal to zero. Although the UE failed to receive the granting GC-PDCCH with the cDAI equal to zero, a subsequent cDAI may increment. In one such example, at time t10, the UE receives a granting GC-PDCCH with a cDAI equal to one.

In some examples, the UE may fail to receive a triggering GC-PDCCH. In such examples, an incorrect codebook size may propagate to a feedback report triggered based on a triggering GC-PDCCH received after the failed triggering GC-PDCCH. That is, if the UE does not detect a triggering GC-PDCCH, the UE may not be aware of the triggering GC-PDCCH and the UE may attempt to transmit accumulated feedback in a feedback report. In some implementations, a triggering GC-PDCCH includes a total DAI value in addition to the latest DAI value to mitigate codebook size errors.

Figure 5:
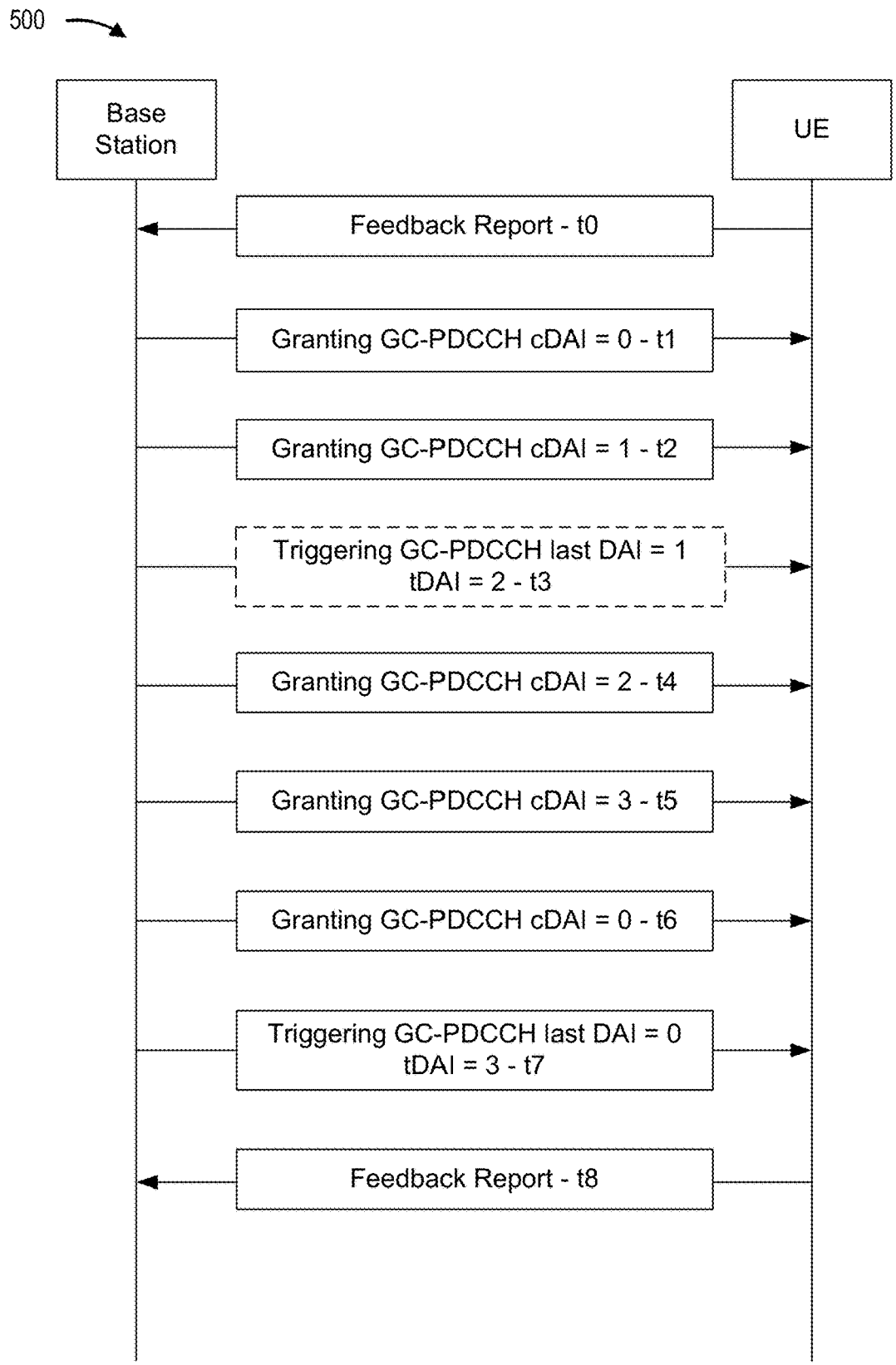
FIG. 5 is a timing diagram illustrating an example of determining a codebook size for a feedback report, in accordance with aspects of the present disclosure.

FIG. 5 is a timing diagram illustrating an example 500 of determining a codebook size for a feedback report, in accordance with aspects of the present disclosure. In FIG. 5, the events at times t0-t2 are similar to the events at times t0-t2 described with respect for FIG. 4. Additionally, as shown in FIG. 5, at time t3, a base station transmits a triggering GC-PDCCH to a UE. In such implementations, the triggering GC-PDCCH includes a total DAI (tDAI) value and a last DAI value. The tDAI indicates a number of cDAI (for example, granting GC-PDCCHs) transmitted since the last triggering GC-PDCCH, or the last feedback report (for example, time t0) transmitted based on the last triggering GC-PDCCH, and the current GC-PDCCH (for example, time t3). In some examples, had the UE received the triggering GC-PDCCH at time t3, the UE may have transmitted a feedback report for the MBMS transmissions associated with the granting GC-PDCCHs received at times t1 and t2. As described above, in the example of FIG. 5, the UE fails to receive the triggering GC-PDCCH transmitted at time t3. Therefore, the UE does not transmit a feedback report for the MBMS transmissions associated with the granting GC-PDCCHs received at times t1 and t2.

Additionally, in the example of FIG. 5, at time t4, the UE receives a granting GC-PDCCH with a cDAI equal to two. At time t5, the UE receives a granting GC-PDCCH with a cDAI equal to three. Furthermore, at time t6, the UE receives a granting GC-PDCCH with a cDAI equal to zero. At time t7, the UE receives a triggering GC-PDCCH with a last DAI value equal to zero and a tDAI equal to three. In the example of FIG. 5, because the UE failed to receive the triggering GC-PDCCH transmitted at time t3, a size of a feedback report (for example, HARQ codebook) may be based on a number of the MBMS transmissions associated with the granting GC-PDCCHs received at times t1, t2, and t4-t7. Still, in the example of FIG. 5, the UE may identify a missing triggering GC-PDCCH based on a mismatch between the tDAI value and the number of the MBMS transmissions associated with the granting GC-PDCCHs received at times t1, t2, and t4-t7. Based on identifying the missing triggering GC-PDCCH, the feedback report may be limited to transmitting feedback for the MBMS transmissions associated with the granting GC-PDCCHs received at times t4-t7. At time t8, the UE may transmit a feedback report including feedback for the MBMS transmissions associated with the granting GC-PDCCHs received at times t4-t7. In some implementations, the UE may drop the feedback for the MBMS transmissions corresponding to the granting GC-PDCCHs received at times t1 and t2.

In some implementations, the UE may be configured for two or more MBMSs and the granting GC-PDCCH may include a different downlink assignment index (DAI) counter for each MBMS of the different MBMSs. In some examples, the different MBMSs may use different group-RNTIs (G-RNTIs). Additionally, in some examples, the UE receives a different triggering GC-PDCCH for each MBMS of the number of MBMSs. In other examples, the UE receives a single triggering GC-PDCCH including a different feedback bit field for each MBMS of the number of MBMSs. In still other examples, the UE receives the single triggering GC-PDCCH including a feedback bit field identifying common feedback resources for the different MBMSs. In such examples, different MBMSs share the K1 parameter and the PRI the. That is, the triggering GC-PDCCH may provide common PUCCH resources for the feedback reports of the different MBMSs. Additionally, in such examples, the single triggering GC-PDCCH may include a separate latest DAI value for each MBMS. In some implementations, the base station may configure the UE to determine feedback resources based on the different triggering GC-PDCCHs, the single triggering GC-PDCCH including a different feedback bit field for each MBMSs, or the single triggering GC-PDCCH including a feedback bit field identifying common feedback resources.

As described, the UE may identify feedback resources for each MBMS of the different MBMSs based on receiving one of the different triggering GC-PDCCHs or the single triggering GC-PDCCH. In such implementations, the feedback resources for each of the MBMSs may be different or overlapping. In some such implementations, the codebook may multiplex or drop one or more feedback reports when the feedback recourses overlap. The one or more feedback reports may be dropped based on a priority rule, such as a priority of the MBMSs.

In some examples, the UE may fail to decode an MBMS transmission. In such examples, the feedback report includes a NAK based on failing to decode the MBMS transmission. In some implementations, based on reporting the NAK, the UE may receive UE-specific DCI including scheduling information for an MBMS retransmission associated with the failed MBMS transmission. In some examples, the MBMS retransmission may be transmitted via a GC-PDSCH.

In some implementations, UE-specific DCI or another UE-specific message may indicate UE-specific feedback resources for a feedback report associated with the MBMS retransmission. In some examples, the UE-specific feedback resources may collide with the feedback resources indicated by a triggering GC-PDCCH. In such examples, the UE-specific feedback resources may be multiplexed with the feedback resources identified in message received on a triggering GC-PDCCH (for example, for an MBMS transmission).

Additionally, in some implementations, the UE-specific DCI includes a DAI counter that is different from a DAI counter of a granting GC-PDCCH. In some such implementations, the UE-specific DCI also includes a total DAI value. In some examples, the total DAI value corresponds to the DAI counter of the UE-specific DCI. In other examples, the total DAI value corresponds to a sum of a total DAI value for the MBMS retransmission(s) associated with the UE-specific DCI and a total DAI value for the MBMS transmissions associated with a set of granting GC-PDCCHs when the UE-specific feedback resources are multiplexed with the MBMS transmission feedback resources. In still other examples, the UE-specific DCI includes a first total DAI value corresponding to a total DAI value for the MBMS retransmission(s) associated with the UE-specific DCI and a second total DAI value corresponding to the second DAI counter of the triggering GC-PDCCH.

In some examples, a feedback report for one or more MBMS transmissions may collide with a unicast uplink transmission, such as a PUSCH transmission or a PUCCH transmission. In some implementations, the UE may assign a priority to the MBMS feedback reports and a priority to the unicast uplink transmissions. In such implementations, the unicast uplink transmission may be a priority one transmission or a priority zero transmission. The UE may drop the MBMS feedback report or the unicast uplink transmission based on the priority. In some examples, the transmission with the lowest priority may be dropped.

In other implementations, the UE may multiplex MBMS feedback reports with the unicast uplink transmissions. In some examples, the UE may separately multiplex MBMS feedback reports with priority one unicast uplink transmissions and priority zero unicast uplink transmissions. In such implementations, the UE may receive a grant for the unicast uplink transmission. The grant may be an uplink grant for a PUSCH or a downlink grant triggering a PUCCH. The grant may be referred to as a unicast grant. Additionally, in such implementations, the unicast grant may include a total DAI value for determining a size of a unicast feedback report. In some examples, the downlink grant includes one total DAI value corresponding to a DAI counter of the unicast grant. In other examples, the downlink grant includes one total DAI value based on a sum of a total DAI value corresponding to the DAI counter of the unicast grant and a total DAI value corresponding to the granting GC-PDCCH. In still other examples, the unicast grant includes a first total DAI value corresponding to the DAI counter of the unicast grant and a second total DAI value corresponding to the granting GC-PDCCH.

Figure 6:
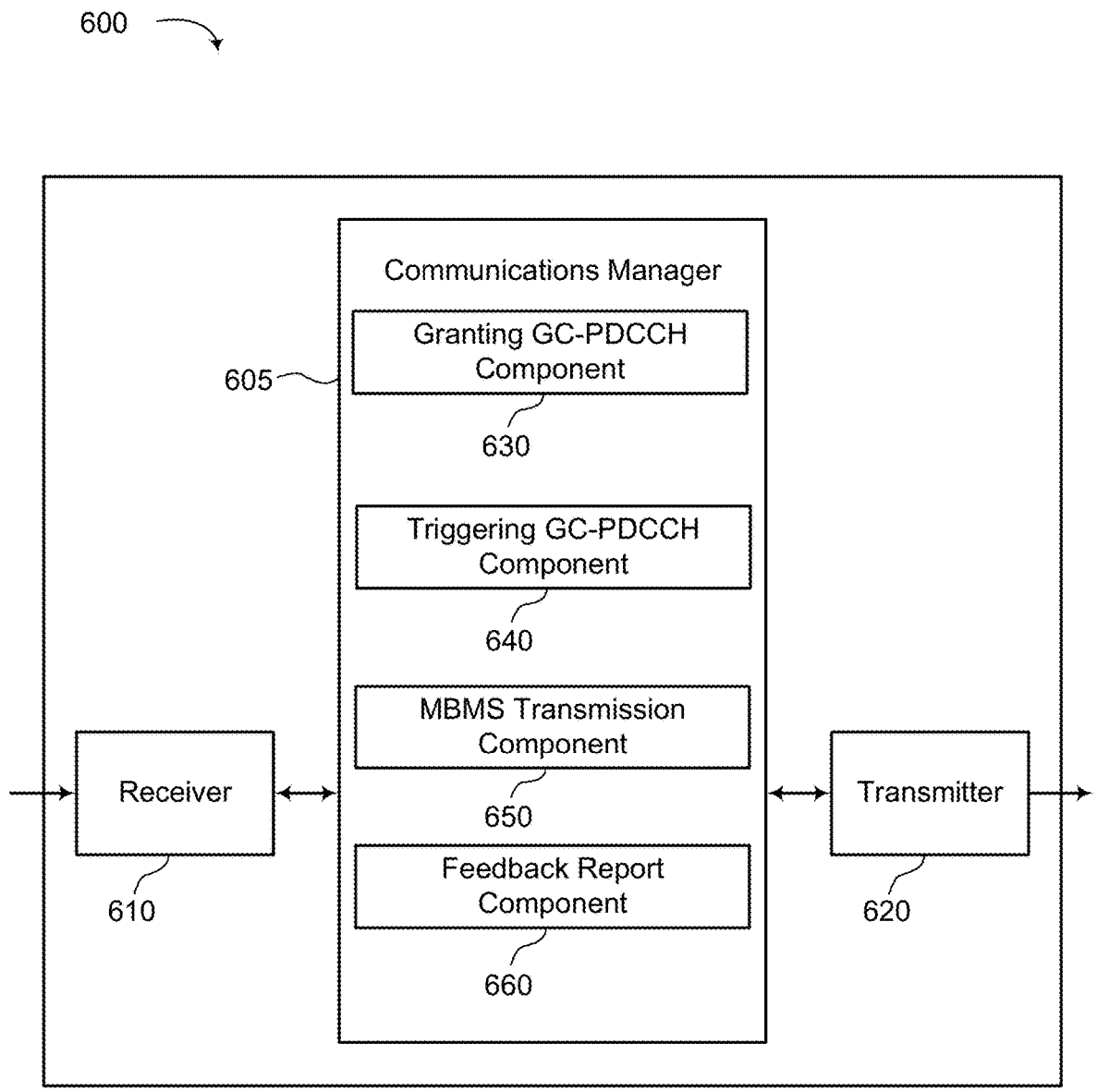
FIG. 6 is a block diagram illustrating an example of a wireless communication device that supports transmitting feedback for a multimedia broadcast multicast service (MBMS) transmission based on a triggering GC-PDCCH, in accordance with aspects of the present disclosure.

FIG. 6 is a block diagram illustrating an example of a wireless communication device 600 that supports transmitting feedback for an MBMS transmission based on a triggering GC-PDCCH, in accordance with aspects of the present disclosure. The device 600 may be an example of aspects of a UE 120 described with reference to FIG. 1. In some examples, the device 600 may be an example of a UE, as described with reference to FIGS. 3-5. The wireless communication device 600 may include a receiver 610, a communications manager 605, a transmitter 620, a granting GC-PDCCH component 630, a triggering GC-PDCCH component 640, a MBMS transmission component 650, and a feedback report component 660, which may be in communication with one another (for example, via one or more buses). In some examples, the wireless communication device 600 is configured to perform operations, including operations of the process 800 described below with reference to FIG. 8.

In some examples, the wireless communication device 600 can include a chip, chipset, package, or device that includes at least one processor and at least one modem (for example, a 5G modem or other cellular modem). In some examples, the communications manager 605, or its subcomponents, may be separate and distinct components. In some examples, at least some components of the communications manager 605 are implemented at least in part as software stored in a memory. For example, portions of one or more of the components of the communications manager 605 can be implemented as non-transitory code executable by the processor to perform the functions or operations of the respective component.

The receiver 610 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a PDCCH) and data channels (for example, a PDSCH). The other wireless communication devices may include, but are not limited to, a base station 110 described with reference to FIG. 1.

The received information may be passed on to other components of the device 600. The receiver 610 may be an example of aspects of the receive processor 258 described with reference to FIG. 2. The receiver 610 may include a set of radio frequency (RF) chains that are coupled with or otherwise utilize a set of antennas (for example, the set of antennas may be an example of aspects of the antennas 252a through 252r described with reference to FIG. 2).

The transmitter 620 may transmit signals generated by the communications manager 605 or other components of the wireless communication device 600. In some examples, the transmitter 620 may be collocated with the receiver 610 in a transceiver. The transmitter 620 may be an example of aspects of the transmit processor 264 described with reference to FIG. 2. The transmitter 620 may be coupled with or otherwise utilize a set of antennas (for example, the set of antennas may be an example of aspects of the antennas 252a through 252r described with reference to FIG. 2), which may be antenna elements shared with the receiver 610. In some examples, the transmitter 620 is configured to transmit control information in a PUCCH and data in a PUSCH.

The communications manager 605 may be an example of aspects of the controller/processor 280 described with reference to FIG. 2. The communications manager 605 may include the granting GC-PDCCH component 630, the triggering GC-PDCCH component 640, the MBMS transmission component 650, and the feedback report component 660. In some implementations, working in conjunction with the receiver 610, the granting GC-PDCCH component 630 may receive, from a base station on a granting GC-PDCCH, an MBMS downlink grant that schedules an MBMS transmission at each UE of a group of UEs that includes a UE associated with the device 600. Additionally, working in conjunction with the receiver 610, the triggering GC-PDCCH component 640 may receive, from the base station on a triggering GC-PDCCH, a message indicating respective feedback resources for each UE of the group of UE. The respective feedback resources may be used to transmit a feedback report for a MBMS transmission associated with the MBMS downlink grant. In such implementations, working in conjunction with the receiver 610, the MBMS transmission component 650 may receive, from the base station, the MBMS transmission based on the MBMS downlink grant. Finally, working in conjunction with the transmitter 620, the granting GC-PDCCH component 630, the triggering GC-PDCCH component 640, and the MBMS transmission component 650, the feedback report component 660 may transmit, to the base station via the feedback resources, a feedback report based on receiving the MBMS transmission.

Figure 7:
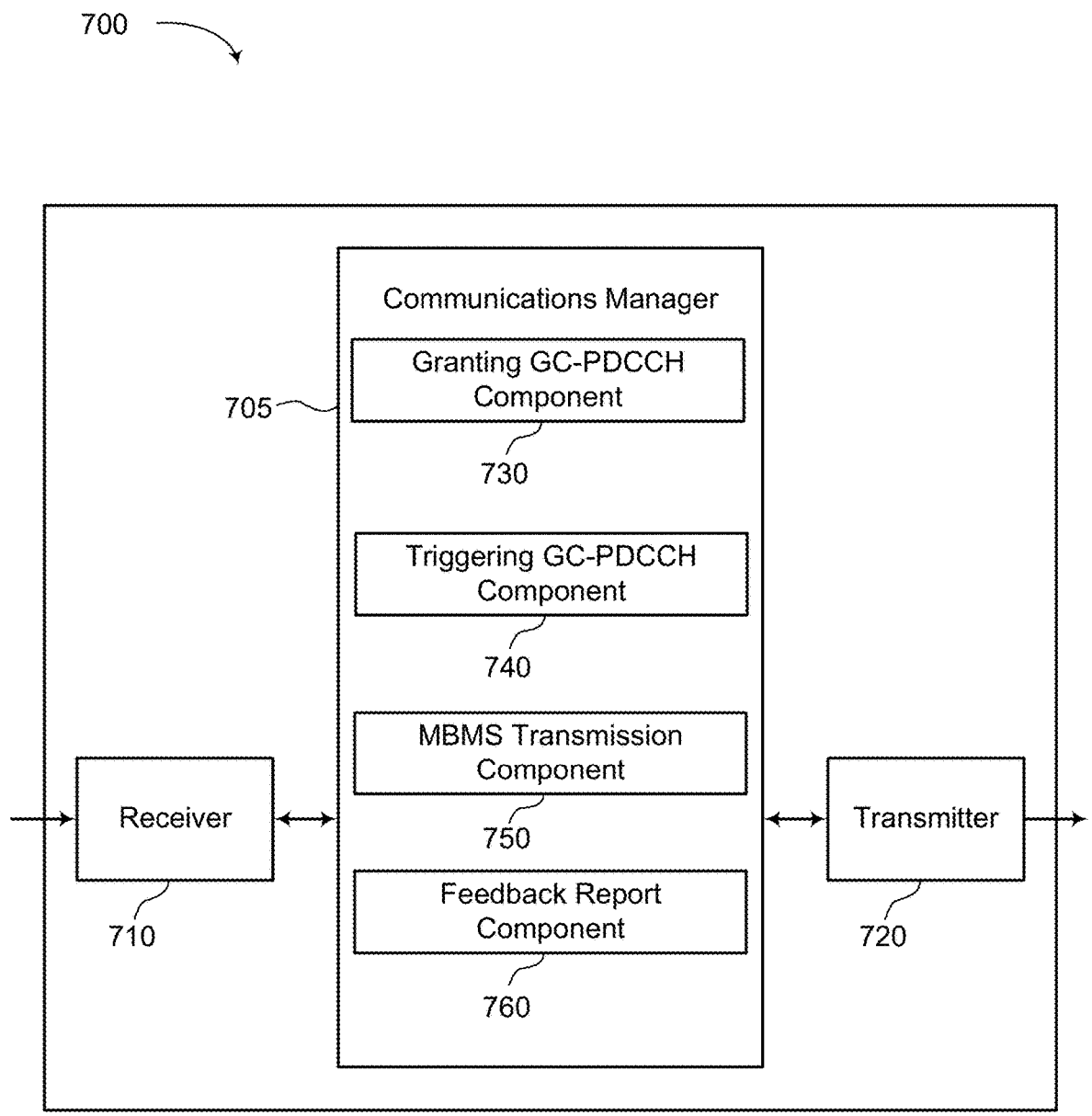
FIG. 7 is a block diagram illustrating an example of a wireless communication device that supports receiving feedback for an MBMS transmission based on a triggering GC-PDCCH, in accordance with aspects of the present disclosure.

FIG. 7 is a block diagram illustrating an example of a wireless communication device 700 that supports receiving feedback for an MBMS transmission based on a triggering GC-PDCCH, in accordance with aspects of the present disclosure. The device 700 may be an example of aspects of a base station, such as a base station 110 described with reference to FIG. 1. The device 700 may implement an architecture for supporting downlink grant transmissions for initiating channel measurements for a downlink channel associated with a multicast transmission. The wireless communication device 700 may include a receiver 710, a communications manager 705, a transmitter 720, a granting GC-PDCCH component 730, a triggering GC-PDCCH component 740, a MBMS transmission component 750, and a feedback report component 760, which may be in communication with one another (for example, via one or more buses). In some examples, the wireless communication device 700 is configured to perform operations, including operations of the process 900 described below with reference to FIG. 9.

In some examples, the wireless communication device 700 can include a chip, chipset, package, or device that includes at least one processor and at least one modem (for example, a 5G modem or other cellular modem). In some examples, the communications manager 705, or its subcomponents, may be separate and distinct components. In some examples, at least some components of the communications manager 705 are implemented at least in part as software stored in a memory. For example, portions of one or more of the components of the communications manager 705 can be implemented as non-transitory code executable by the processor to perform the functions or operations of the respective component.

The receiver 710 may receive one or more of signals, control information and data information, such as in the form of packets, from one or more other wireless communication devices via various channels, including control channels (for example, a PUCCH) and data channels (for example, a PUSCH). The other wireless communication devices may include, but are not limited to, a UE 120 as described with reference to FIG. 1. In aspects of the present disclosure, the wireless communication device 700 may forward and receive information via a backhaul connection.

The device 700 may pass received information to other components of the device 700. The receiver 710 may be an example of aspects of the receive processor 238 described with reference to FIG. 2. The receiver 710 may include a set of RF chains that are coupled with or otherwise utilize a set of antennas (for example, the set of antennas may be an example of aspects of the antennas 234a through 234t described with reference to FIG. 2).

The transmitter 720 may transmit signals generated by the communications manager 705 or other components of the wireless communication device 700. In some examples, the transmitter 720 may be collocated with the receiver 710 in a transceiver. The transmitter 720 may be an example of aspects of the transmit processor 220 described with reference to FIG. 2. The transmitter 720 may be coupled with or otherwise utilize a set of antennas (for example, the set of antennas may be an example of aspects of the antennas 234a through 234t described with reference to FIG. 2), which may be antenna elements shared with the receiver 710. In some examples, the transmitter 720 is configured to transmit control information in a PDCCH and data in a PDSCH.

The communications manager 705 may be an example of aspects of the controller/processor 240 described with reference to FIG. 2. The communications manager 705 may include the granting GC-PDCCH component 730, the triggering GC-PDCCH component 740, the MBMS transmission component 750, and the feedback report component 760. In some implementations, working in conjunction with the transmitter 720, the granting GC-PDCCH component 730 may transmit, to multiple UEs via a granting GC-PDCCH, an MBMS downlink gran that schedules an MBMS transmission at each UE of the multiple UEs. Additionally, working in conjunction with the transmitter 720, the triggering GC-PDCCH component 740 may transmit, to each UE of the multiple UEs via a triggering GC-PDCCH, a message indicating respective feedback resources for the MBMS transmission. Furthermore, working in conjunction with the transmitter 720, the MBMS transmission component 750 may transmit, to the multiple UEs, the MBMS transmission based on the MBMS downlink grant. Finally, working in conjunction with the receiver 719, the feedback report component 760 may receive, from each UE of the multiple UEs via the respective feedback resources, a feedback report associated with the MBMS transmission.

Figure 8:
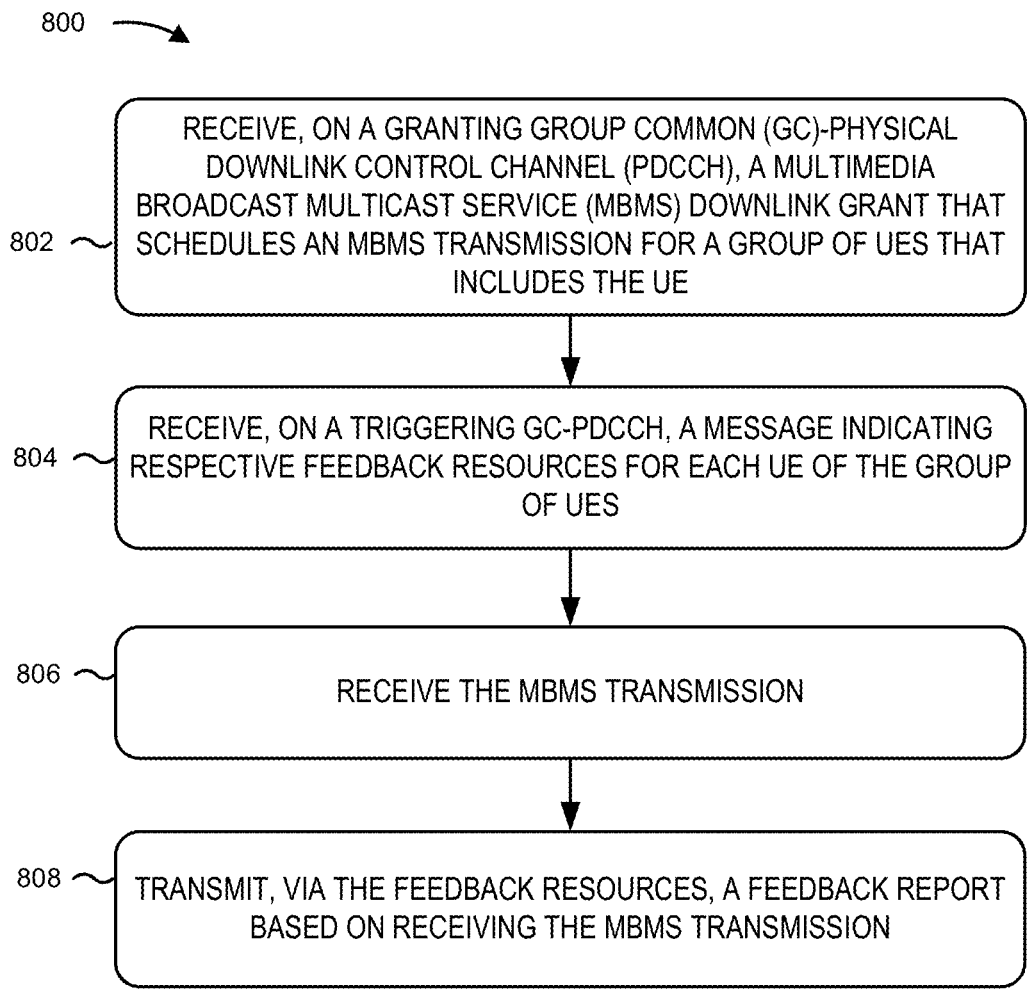
FIG. 8 is a diagram illustrating an example process performed at a UE that supports transmitting feedback for an MBMS transmission based on a triggering GC-PDCCH, in accordance with various aspects of the present disclosure.

FIG. 8 is a diagram illustrating an example process 800 performed at a UE that supports transmitting feedback for an MBMS transmission based on a triggering GC-PDCCH, in accordance with various aspects of the present disclosure. The example process 800 is an example of transmitting feedback for an MBMS transmission based on a triggering GC-PDCCH, in accordance with various aspects of the present disclosure. The operations of the process 800 may be implemented by a UE, such as a UE 120, or its components, described with reference to FIG. 1. For example, operations of the process 800 may be performed by one or more of the receiver 610, the communications manager 605, the transmitter 620, the granting GC-PDCCH component 630, the triggering GC-PDCCH component 640, the MBMS transmission component 650, and the feedback report component 660, as described with reference to FIG. 6 In some examples, a UE may execute a set of instructions to control the functional elements of the UE to perform the operations or functions described below. Additionally, or alternatively, a UE may perform aspects of the operations or functions described below using special-purpose hardware.

At block 802, the process 800 may receive, from a base station on a granting GC-PDCCH, an MBMS downlink grant that schedules an MBMS transmission at each UE of a group of UEs that includes the UE. At block 804, the process 800 may receive, from the base station on a triggering GC-PDCCH, a message indicating respective feedback resources for each UE of the group of UEs. Additionally, at block 806, the process 800 may receive, from the base station, the MBMS transmission. Furthermore, at block 808, the process 800 may transmit, to the base station via the feedback resources, a feedback report based on receiving the MBMS transmission.

Figure 9:
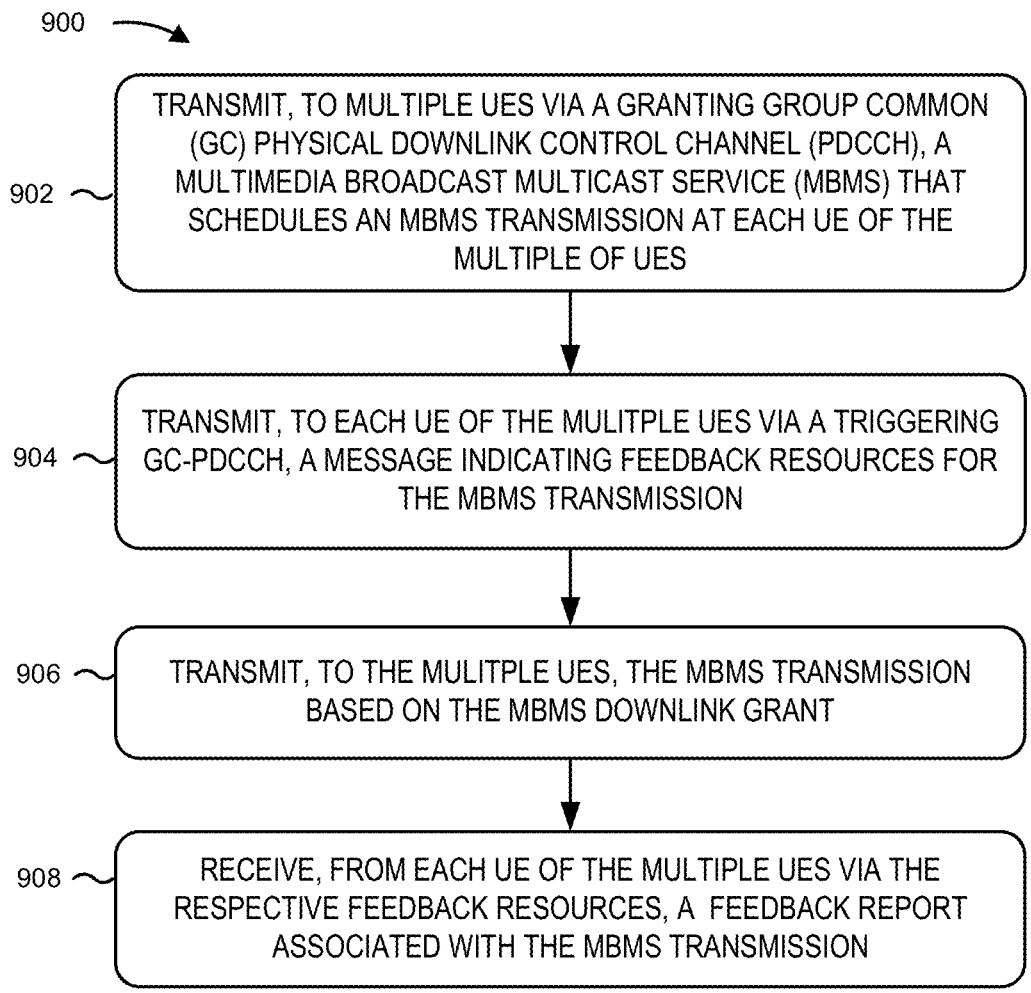
FIG. 9 is a diagram illustrating an example process performed at a base station that supports receiving feedback for an MBMS transmission based on a triggering GC-PDCCH, in accordance with various aspects of the present disclosure.

FIG. 9 is a diagram illustrating an example process performed at a base station that supports receiving feedback for an MBMS transmission based on a triggering GC-PDCCH, in accordance with various aspects of the present disclosure. The example process 900 is an example of receiving feedback for an MBMS transmission based on a triggering GC-PDCCH, in accordance with various aspects of the present disclosure. The operations of the process 900 may be implemented by a base station, such as a base station 110, or its components, described with reference to FIG. 1. For example, operations of the process 900 may be performed by one or more of the receiver 710, the communications manager 705, the transmitter 720, the granting GC-PDCCH component 730, the triggering GC-PDCCH component 740, the MBMS transmission component 750, and the feedback report component 760, as described with reference to FIG. 7. In some examples, a base station may execute a set of instructions to control the functional elements of the base station to perform the operations or functions described below. Additionally, or alternatively, a base station may perform aspects of the operations or functions described below using special-purpose hardware.

As shown in FIG. 9, at block 902, the base station may transmit, to multiple UEs via a granting GC-PDCCH, an MBMS downlink grant that schedules an MBMS transmission at each UE of the multiple UEs. At block 904, the base station may transmit, to each UE of the multiple UEs via a triggering GC-PDCCH, a message indicating respective feedback resources for the MBMS transmission. Furthermore, at block 906, the base station may transmit, to the multiple UEs, the MBMS transmission based on the MBMS downlink grant. Finally, at block 908, the base station may receive, from each UE of the multiple UEs via the respective feedback resources, a feedback report associated with the MBMS transmission.

The following provides an overview of some Aspects of the present disclosure:

Aspect 1. A method for wireless communication performed by a UE, comprising: receiving, from a base station on a granting GC-PDCCH, an MBMS downlink grant that schedules an MBMS transmission at each UE of a group of UEs that includes the UE; receiving, from the base station on a triggering GC-PDCCH, a message indicating respective feedback resources for each UE of the group of UEs; receiving, from the base station, the MBMS transmission; and transmitting, to the base station via the feedback resources, a feedback report based on receiving the MBMS transmission.

Aspect 2. The method of Aspect 1, further comprising: receiving a search space parameter that configures a search space associated with the triggering GC-PDCCH, a length of the triggering GC-PDCCH, an RNTI of the triggering GC-PDCCH, and one or more feedback bit fields associated with the triggering GC-PDCCH, wherein the one or more feedback bit fields indicate a timing for the feedback report, a codebook size for the feedback report, and a PUCCH PRI associated with the feedback resources; monitoring the search space for the triggering GC-PDCCH based on the search space parameter; and monitoring the one or more feedback bit fields of the triggering GC-PDCCH based on the search space parameter.

Aspect 3. The method of any one of Aspects 1-2, wherein the triggering GC-PDCCH comprises a latest DAI value corresponding to a DAI counter of a last granting GC-PDCCH.

Aspect 4. The method of Aspect 3, further comprising: receiving a set of MBMS transmissions granted by a set of granting GC-PDCCHs between a first time associated with transmitting a prior feedback report and a second time associated with transmitting the feedback report, wherein the prior feedback report is transmitted prior to the feedback report, and the granting GC-PDCCH is one granting GC-PDCCH in the set of granting GC-PDCCHs; and identifying the set of MBMS transmissions based on a respective DAI counter associated with each granting GC-PDCCH of the set of granting GC-PDCCHs and the latest DAI value, wherein the feedback report comprises feedback for the set of MBMS transmissions granted by the set of granting GC-PDCCHs based on identifying the set of MBMS transmissions.

Aspect 5. The method of Aspect 4, further comprising identifying a missing MBMS transmission based on a mismatch between a latest received DAI counter of a latest received granting GC-PDCCH of the set of granting GC-PDCCHs and the latest DAI value, wherein the feedback report comprises a negative acknowledgement (NAK) for a position corresponding to the missing MBMS transmission.

Aspect 6. The method of Aspect 4, wherein the triggering GC-PDCCH comprises a total DAI value, and the method further comprises identifying a missing triggering GC-PDCCH based on a mismatch between a number of MBMS transmission in the set of MBMS transmissions and the total DAI value.

Aspect 7. The method of any one of Aspects 1-6, wherein the UE is configured to receive a plurality of MBMS transmissions and the granting GC-PDCCH comprises a different DAI counter for each MBMS transmission of the plurality of MBMS transmissions.

Aspect 8. The method of Aspect 7, further comprising: receiving a different triggering GC-PDCCH for each MBMS transmission of the plurality of MBMS transmissions; and identifying respective feedback resources for each MBMS transmission of the plurality of MBMS transmissions based on receiving the different triggering GC-PDCCHs, wherein the respective feedback resources for each MBMS transmission of the plurality of MBMS transmissions are different or overlapping.

Aspect 9. The method of Aspect 7, further comprising receiving a single triggering GC-PDCCH for the plurality of MBMS transmissions, wherein: the single triggering GC-PDCCH comprises a feedback bit field identifying common feedback resources for the plurality of MBMS transmissions; or a different feedback bit field for each MBMS transmission of the plurality of MBMS transmissions.

Aspect 10. The method of any one of Aspects 1-9, further comprising: failing to decode the MBMS transmission, wherein the feedback report comprises a negative acknowledgement based on failing to decode the MBMS transmission; and receiving UE-specific DCI comprising scheduling information for an MBMS retransmission associated with the MBMS transmission based on the feedback report comprising the negative acknowledgement, wherein the UE-specific DCI comprises a first DAI counter.

Aspect 11. The method of Aspect 10, wherein the UE-specific DCI comprises: one or more total DAI values corresponding to the first DAI counter or a sum of the first DAI counter and a second DAI counter; or a first total DAI value corresponding to the first DAI counter and a second total DAI value corresponding to the second DAI counter of the triggering GC-PDCCH.

Aspect 12. The method of any one of Aspects 1-11, further comprising: determining a first priority for the feedback report and a second priority for a unicast uplink transmission based on the feedback report colliding with the unicast uplink transmission; and transmitting one of the feedback report or the unicast uplink transmission based on the first priority and the second priority.

Aspect 13. The method of any one of Aspects 1-12, further comprising: receiving an uplink grant for a unicast uplink transmission; and transmitting a multiplexed feedback report comprising the feedback report multiplexed with the unicast uplink transmission based on the feedback report colliding with the unicast uplink transmission, wherein the uplink grant comprises: one or more total DAI values corresponding to a first DAI counter of the uplink grant or a sum of the first DAI counter and a second DAI counter of the triggering GC-PDCCH; or a first total DAI value corresponding to the first DAI counter and a second total DAI value corresponding to the second DAI counter.

Aspect 14. A method for wireless communication performed by a base station, comprising: transmitting, to a plurality of UEs via a granting GC-PDCCH, an MBMS downlink grant that schedules an MBMS transmission at each UE of the plurality of UEs; transmitting, to each UE of the plurality of UEs via a triggering GC-PDCCH, a message indicating respective feedback resources for the MBMS transmission associated with the MBMS downlink grant; transmitting, to the plurality of UEs, the MBMS transmission based on the MBMS downlink grant; and receiving, from each UE of the plurality of UEs via the respective feedback resources, a feedback report associated with the MBMS transmission.

Aspect 15. The method of Aspect 14, further comprising transmitting a configuration comprising a search space for the triggering GC-PDCCH, a length of the triggering GC-PDCCH, a RNTI of the triggering GC-PDCCH, and one or more feedback bit fields of the triggering GC-PDCCH, wherein the one or more feedback bit fields indicate a timing for the feedback report, a codebook size for the feedback report, and a PUCCH PRI for the feedback resources.

Aspect 16. The method of any one of Aspects 14-15, wherein the triggering GC-PDCCH comprises a DAI value and the granting GC-PDCCH comprises a DAI counter.

Aspect 17. The method of Aspect 16, further comprising setting the DAI value to identify a set of MBMS transmissions granted by a set of granting GC-PDCCHs based on a last DAI counter associated with the set of granting GC-PDCCHs, wherein: the respective feedback report of each UE comprises feedback associated with the set of MBMS transmissions; and the granting GC-PDCCH is one granting GC-PDCCH of the set of granting GC-PDCCHs.

Aspect 18. The method of Aspect 17, wherein: the triggering GC-PDCCH comprises a total DAI value; and the feedback report comprises feedback for the set of MBMS transmissions based on the DAI value and the total DAI value.

Aspect 19. The method of any one of Aspects 14-18, further comprising configuring each UE of the plurality of UEs for a plurality of MBMS transmissions, wherein the granting GC-PDCCH comprises a different DAI counter for each MBMS transmission of the plurality of MBMS transmissions.

Aspect 20. The method of Aspect 19, further comprising transmitting a different triggering GC-PDCCH for each MBMS transmission of the plurality of MBMS transmissions or a single triggering GC-PDCCH.

Aspect 21. The method of Aspect 19, further comprising transmitting a single triggering GC-PDCCH for the plurality of MBMS transmissions, wherein: the single triggering GC-PDCCH comprises a feedback bit field identifying common feedback resources for the plurality of MBMS transmissions; or a different feedback bit field for each MBMS transmission of the plurality of MBMS transmissions.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and the like.

It will be apparent that systems and/or methods described may be implemented in different forms of hardware, firmware, and a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and methods based, at least in part, on the description.

Even though particular combinations of features are recited in the claims and disclosed in the specification, these combinations are not intended to limit the disclosure of various aspects. In fact, many of these features may be combined in ways not specifically recited in the claims and disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

As used "or" is used intended to be interpreted in the inclusive sense, unless otherwise explicitly indicated. For example, "a or b" may include a only, b only, or a combination of a and b. As used, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

What is claimed is:

1. A method for wireless communication performed by a user equipment (UE), comprising:
receiving, from a network device on a granting group common (GC)-physical downlink control channel (PDCCH), a multimedia broadcast multicast service (MBMS) downlink grant that schedules an MBMS transmission for a group of UEs that includes the UE;
receiving, from a network device, a search space parameter that configures a search space associated with a triggering GC-PDCCH, a length associated with the triggering GC-PDCCH, a radio network temporary identifier (RNTI) associated with the triggering GC-PDCCH, and one or more feedback bit fields associated with the triggering GC-PDCCH;
receiving, from a network device, on the triggering GC-PDCCH in association with monitoring the search space, the one or more feedback bit fields indicating respective feedback resources for each UE of the group of UEs; and transmitting, to a network device via the respective feedback resources for the UE, a feedback report associated with the MBMS transmission.

2. The method of claim 1, wherein the one or more feedback bit fields indicate a timing for the feedback report, a codebook size for the feedback report, and a physical uplink control channel (PUCCH) resource indicator (PRI) associated with the feedback resources.

3. The method of claim 1, wherein the triggering GC-PDCCH comprises a latest downlink assignment index (DAI) value corresponding to a DAI counter of a last granting GC-PDCCH.

4. The method of claim 3, further comprising:
receiving a set of MBMS transmissions granted by a set of granting GC-PDCCHs between a first time associated with transmitting a prior feedback report and a second time associated with transmitting the feedback report, wherein the prior feedback report is transmitted prior to the feedback report, and the granting GC-PDCCH is one granting GC-PDCCH in the set of granting GC-PDCCHs; and
identifying the set of MBMS transmissions based on a respective DAI counter associated with each granting GC-PDCCH of the set of granting GC-PDCCHs and the latest DAI value, wherein the feedback report comprises feedback for the set of MBMS transmissions granted by the set of granting GC-PDCCHs based on identifying the set of MBMS transmissions.

5. The method of claim 4, further comprising identifying a missing MBMS transmission based on a mismatch between a latest received DAI counter of a latest received granting GC-PDCCH of the set of granting GC-PDCCHs and the latest DAI value, wherein the feedback report comprises a negative acknowledgement (NAK) for a position corresponding to the missing MBMS transmission.

6. The method of claim 4, wherein the triggering GC-PDCCH comprises a total DAI value, and the method further comprises identifying a missing triggering GC-PDCCH based on a mismatch between a number of MBMS transmission in the set of MBMS transmissions and the total DAI value.

7. The method of claim 1, wherein the UE is configured to receive a plurality of MBMS transmissions and the granting GC-PDCCH comprises a different downlink assignment index (DAI) counter for each MBMS transmission of the plurality of MBMS transmissions.

8. The method of claim 7, further comprising:
receiving a different triggering GC-PDCCH for each MBMS transmission of the plurality of MBMS transmissions; and
identifying respective feedback resources for each MBMS transmission of the plurality of MBMS transmissions based on receiving the different triggering GC-PDCCHs, wherein the respective feedback resources for each MBMS transmission of the plurality of MBMS transmissions are different or overlapping.

9. The method of claim 7, further comprising receiving a single triggering GC-PDCCH for the plurality of MBMS transmissions, wherein:
the single triggering GC-PDCCH comprises a feedback bit field identifying common feedback resources for the plurality of MBMS transmissions; or a different feedback bit field for each MBMS transmission of the plurality of MBMS transmissions.

10. The method of claim 1, further comprising:
failing to decode the MBMS transmission, wherein the feedback report comprises a negative acknowledgement based on failing to decode the MBMS transmission; and
receiving UE-specific downlink control information (DCI) comprising scheduling information for an MBMS retransmission associated with the MBMS transmission based on the feedback report comprising the negative acknowledgement, wherein the UE-specific DCI comprises a first downlink assignment index (DAI) counter.

11. The method of claim 10, wherein the UE-specific DCI comprises:
one or more total DAI values corresponding to the first DAI counter or a sum of the first DAI counter and a second DAI counter; or
a first total DAI value corresponding to the first DAI counter and a second total DAI value corresponding to the second DAI counter of the triggering GC-PDCCH.

12. The method of claim 1, further comprising:
determining a first priority for the feedback report and a second priority for a unicast uplink transmission based on the feedback report colliding with the unicast uplink transmission; and
transmitting one of the feedback report or the unicast uplink transmission based on the first priority and the second priority.

13. The method of claim 1, further comprising:
receiving an uplink grant for a unicast uplink transmission; and
transmitting a multiplexed feedback report comprising the feedback report multiplexed with the unicast uplink transmission based on the feedback report colliding with the unicast uplink transmission, wherein the uplink grant comprises:
one or more total downlink assignment index (DAI) values corresponding to a first DAI counter of the uplink grant or a sum of the first DAI counter and a second DAI counter of the triggering GC-PDCCH; or
a first total DAI value corresponding to the first DAI counter and a second total DAI value corresponding to the second DAI counter.

14. An apparatus for wireless communications at a user equipment (UE), comprising:
one or more memory components storing code; and
one or more processor components operable to, when executing the code, cause the apparatus to:
receive, from a network device on a granting group common (GC)-physical downlink control channel (PDCCH), a multimedia broadcast multicast service (MBMS) downlink grant that schedules an MBMS transmission for a group of UEs that includes the UE;
receive, from a network device, a search space parameter that configures a search space associated with a triggering GC-PDCCH, a length associated with the triggering GC-PDCCH, a radio network temporary identifier (RNTI) associated with the triggering GC-PDCCH, and one or more feedback bit fields associated with the triggering GC-PDCCH;
receive, from a network device, on the triggering GC-PDCCH in association with monitoring the search space, the one or more feedback bit fields indicating respective feedback resources for each UE of the group of UEs; and transmit, to a network device via the respective feedback resources for the UE, a feedback report associated with the MBMS transmission.

15. The apparatus of claim 14, wherein
the one or more feedback bit fields indicate a timing for the feedback report, a codebook size for the feedback report, and a physical uplink control channel (PUCCH) resource indicator (PRI) associated with the feedback resources.

16. The apparatus of claim 14, wherein the triggering GC-PDCCH comprises a latest downlink assignment index (DAI) value corresponding to a DAI counter of a last granting GC-PDCCH.

17. A method for wireless communication performed by a network device, comprising:
transmitting, to a plurality of user equipment (UEs) via a granting group common (GC)-physical downlink control channel (PDCCH), a multimedia broadcast multicast service (MBMS) downlink grant that schedules an MBMS transmission for the plurality of UEs;
transmitting a search space parameter that configures a search space associated with a triggering GC-PDCCH, a length associated with the triggering GC-PDCCH, a radio network temporary identifier (RNTI) associated with the triggering GC-PDCCH, and one or more feedback bit fields associated with the triggering GC-PDCCH;
transmitting, to each UE of the plurality of UEs via the triggering GC-PDCCH, the one or more feedback bit fields indicating respective feedback resources for each UE of the group of UEs;
transmitting, to the plurality of UEs, the MBMS transmissions; and
receiving, from each of one or more UEs of the plurality of UEs via the respective feedback resources, a respective feedback report associated with the MBMS transmission.

18. The method of claim 17, wherein the one or more feedback bit fields indicate a timing for the feedback report, a codebook size for the feedback report, and a physical uplink control channel (PUCCH) resource indicator (PRI) for the feedback resources.

19. The method of claim 17, wherein the triggering GC-PDCCH comprises a downlink assignment index (DAI) value and the granting GC-PDCCH comprises a DAI counter.

20. The method of claim 19, further comprising setting the DAI value to identify a set of MBMS transmissions granted by a set of granting GC-PDCCHs based on a last DAI counter associated with the set of granting GC-PDCCHs, wherein:
the respective feedback report of each UE comprises feedback associated with the set of MBMS transmissions; and
the granting GC-PDCCH is one granting GC-PDCCH of the set of granting GC-PDCCHs.

21. The method of claim 20, wherein:
the triggering GC-PDCCH comprises a total DAI value; and
the feedback report comprises feedback for the set of MBMS transmissions based on the DAI value and the total DAI value.

22. The method of claim 17, further comprising configuring each UE of the plurality of UEs for a plurality of MBMS transmissions, wherein the granting GC-PDCCH comprises a different downlink assignment index (DAI) counter for each MBMS transmission of the plurality of MBMS transmissions.

23. The method of claim 22, further comprising transmitting a different triggering GC-PDCCH for each MBMS transmission of the plurality of MBMS transmissions or a single triggering GC-PDCCH.

24. The method of claim 22, further comprising transmitting a single triggering GC-PDCCH for the plurality of MBMS transmissions, wherein:
the single triggering GC-PDCCH comprises a feedback bit field identifying common feedback resources for the plurality of MBMS transmissions; or
a different feedback bit field for each MBMS transmission of the plurality of MBMS transmissions.

25. An apparatus for wireless communications at a network device, comprising:
one or more memory components storing code; and
one or more processor components operable to, when executing the code, cause the apparatus to:
transmit, to a plurality of user equipment (UEs) via a granting group common (GC)-physical downlink control channel (PDCCH), a multimedia broadcast multicast service (MBMS) downlink grant that schedules an MBMS transmission for the plurality of UEs;
transmit a search space parameter that configures a search space associated with a triggering GC-PDCCH, a length associated with the triggering GC-PDCCH, a radio network temporary identifier (RNTI) associated with the triggering GC-PDCCH, and one or more feedback bit fields associated with the triggering GC-PDCCH;
transmit, to each UE of the plurality of UEs via the triggering GC-PDCCH, the one or more feedback bit fields indicating respective feedback resources for each UE of the group of UEs;
transmit, to the plurality of UEs, the MBMS transmission; and
receive, from each of one or more UEs of the plurality of UEs via the respective feedback resources, a respective feedback report associated with the MBMS transmission.

26. The apparatus of claim 25, wherein the one or more feedback bit fields indicate a timing for the feedback report, a codebook size for the feedback report, and a physical uplink control channel (PUCCH) resource indicator (PRI) for the feedback resources.

27. The apparatus of claim 25, wherein the triggering GC-PDCCH comprises a downlink assignment index (DAI) value and the granting GC-PDCCH comprises a DAI counter.

28. The apparatus of claim 27, wherein execution of the instructions further cause the apparatus to set the DAI value to identify a set of MBMS transmissions granted by a set of granting GC-PDCCHs based on a last DAI counter associated with the set of granting GC-PDCCHs, wherein:
the respective feedback report of each UE comprises feedback associated with the set of MBMS transmissions; and
the granting GC-PDCCH is one granting GC-PDCCH of the set of granting GC-PDCCHs.

29. The apparatus of claim 25, further comprising configuring each UE of the plurality of UEs for a plurality of MBMS transmissions, wherein the granting GC-PDCCH comprises a different downlink assignment index (DAI) counter for each MBMS transmission of the plurality of MBMS transmissions.

30. The apparatus of claim 29, further comprising transmitting a different triggering GC-PDCCH for each MBMS transmission of the plurality of MBMS transmissions or a single triggering GC-PDCCH.

* * * * *